United States Patent
Westerman

(10) Patent No.: US 9,310,995 B2
(45) Date of Patent: Apr. 12, 2016

(54) TOUCH INPUT TRANSITIONS

(75) Inventor: Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 816 days.

(21) Appl. No.: 13/251,073

(22) Filed: Sep. 30, 2011

(65) Prior Publication Data

US 2012/0019469 A1  Jan. 26, 2012

Related U.S. Application Data

(63) Continuation of application No. 12/891,635, filed on Sep. 27, 2010.

(60) Provisional application No. 61/367,860, filed on Jul. 26, 2010.

(51) Int. Cl.
G06F 3/044 (2006.01)
G06F 3/0488 (2013.01)

(52) U.S. Cl.
CPC ............ G06F 3/04883 (2013.01); G06F 3/044 (2013.01); G06F 2203/04808 (2013.01)

(58) Field of Classification Search
CPC .............. G06F 3/017; G06F 3/0488–3/04886; G06F 2203/04808
USPC ............ 345/156–184, 104; 178/18.01–20.04; 715/863
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 * | 11/2001 | Westerman ........... | G06F 3/0235 345/173 |

(Continued)

FOREIGN PATENT DOCUMENTS

| | | |
|---|---|---|
| GB | 2 409 017 A | 6/2005 |
| JP | 2000-163031 A | 6/2000 |

(Continued)

OTHER PUBLICATIONS

International Search Report mailed Sep. 22, 2011, for PCT Application No. PCT/US11/45115, filed Jul. 22, 2011, three pages.

(Continued)

*Primary Examiner* — Patrick F Marinelli
(74) *Attorney, Agent, or Firm* — Morrison & Foerster LLP

(57) ABSTRACT

Selection of input of a touch sensing surface is provided. Contacts on or near a surface are tracked to obtain touch information of the contacts. A first gesture is detected corresponding to first touch information of a number of contacts performing an activity, and a first input corresponding to the first gesture is selected. A second gesture is detected corresponding to second touch information of a number of contacts performing an activity. A determination of whether to select a second input corresponding to the second gesture is made. The second input is selected if third information satisfies a predetermined criteria, and the first input is maintained if the third information does not satisfy the predetermined criteria.

30 Claims, 11 Drawing Sheets

(56) References Cited

U.S. PATENT DOCUMENTS

| | | | |
|---|---|---|---|
| 6,690,387 B2 | | 2/2004 | Zimmerman et al. |
| 6,730,863 B1 * | | 5/2004 | Gerpheide ............ G06F 3/044 |
| | | | 178/18.02 |
| 6,958,749 B1 | | 10/2005 | Matsushita et al. |
| 7,015,894 B2 | | 3/2006 | Morohoshi |
| 7,184,064 B2 | | 2/2007 | Zimmerman et al. |
| 7,345,675 B1 * | | 3/2008 | Minakuchi ............ G06F 3/0485 |
| | | | 345/156 |
| 7,400,318 B2 * | | 7/2008 | Gerpheide ............ G06F 3/044 |
| | | | 178/18.01 |
| 7,663,607 B2 | | 2/2010 | Hotelling et al. |
| 7,877,707 B2 * | | 1/2011 | Westerman ......... G06F 3/04883 |
| | | | 715/863 |
| 2004/0188151 A1 * | | 9/2004 | Gerpheide ............ G06F 3/044 |
| | | | 178/18.01 |
| 2004/0189616 A1 * | | 9/2004 | Gerpheide ............ G06F 3/044 |
| | | | 345/174 |
| 2004/0189617 A1 * | | 9/2004 | Gerpheide ............ G06F 3/044 |
| | | | 345/174 |
| 2006/0026521 A1 | | 2/2006 | Hotelling et al. |
| 2006/0066588 A1 * | | 3/2006 | Lyon ................... G06F 3/0488 |
| | | | 345/173 |
| 2006/0197753 A1 | | 9/2006 | Hotelling |
| 2007/0081726 A1 | | 4/2007 | Westerman et al. |
| 2008/0042978 A1 * | | 2/2008 | Perez-Noguera ..... G06F 3/0202 |
| | | | 345/168 |
| 2008/0084400 A1 | | 4/2008 | Rosenberg |
| 2008/0165141 A1 * | | 7/2008 | Christie ................. G06F 3/044 |
| | | | 345/173 |
| 2008/0168384 A1 | | 7/2008 | Platzer et al. |
| 2008/0168404 A1 | | 7/2008 | Ording |
| 2010/0079498 A1 * | | 4/2010 | Zaman ................. G06F 3/0481 |
| | | | 345/661 |
| 2012/0019452 A1 * | | 1/2012 | Westerman ......... G06F 3/04883 |
| | | | 345/173 |
| 2012/0019453 A1 * | | 1/2012 | Westerman ......... G06F 3/04883 |
| | | | 345/173 |
| 2012/0019469 A1 * | | 1/2012 | Westerman ......... G06F 3/04883 |
| | | | 345/173 |

FOREIGN PATENT DOCUMENTS

| | | |
|---|---|---|
| JP | 2002-342033 A | 11/2002 |
| WO | WO-2006/020305 A2 | 2/2006 |
| WO | WO-2006/020305 A3 | 2/2006 |
| WO | WO-2012/015701 A1 | 2/2012 |
| WO | WO-2012/015705 A1 | 2/2012 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements of the Degree of Doctor of Philosophy in Electrical Engineering, 364 pages.

Cao, X. et al. (Oct. 1, 2008). "ShapeTouch: Leveraging Contact Shape on Interactive Surfaces," *IEEE* pp. 129-136.

Eslambolchilar, P. et al. ((Dec. 1, 2008). "Control Centric Approach in Designing Scrolling and Zooming User Interfaces," *Int. J. Human-Computer Studies* 66(12):838-856.

International Search Report mailed Oct. 10, 2011, for PCT Application No. PCT/US2011/045109, filed Jul. 22, 2011, four pages.

\* cited by examiner

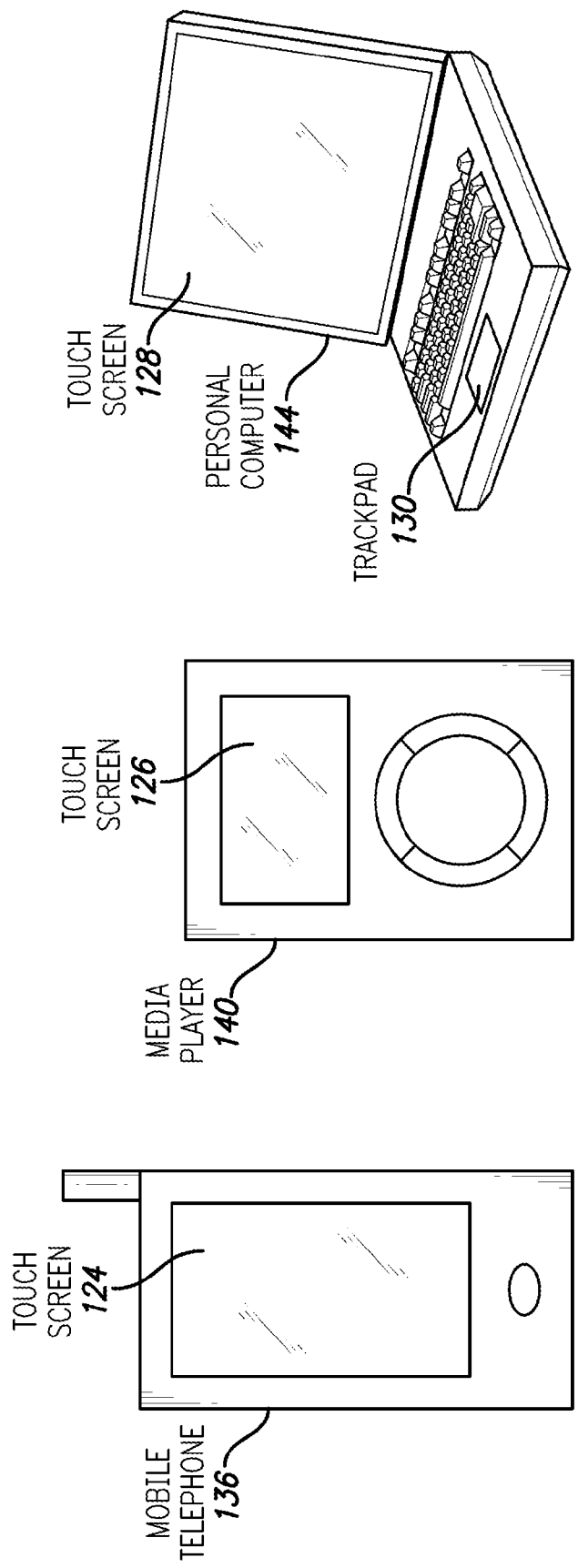

TOUCH INPUT TRANSITIONS

CROSS REFERENCE TO RELATED APPLICATIONS

This application is a continuation of U.S. patent application Ser. No. 12/891,635, filed Sep. 27, 2010, which claims benefit of U.S. Provisional Application Ser. No. 61/367,860, filed Jul. 26, 2010, the contents of both which are incorporated by reference herein in their entirety for all purposes.

FIELD OF THE DISCLOSURE

This relates generally to transitions between touch input selections, and more particularly, to selecting an input of contacts on or near a touch sensing surface.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a transparent touch sensor panel positioned in front of a display device such as a liquid crystal display (LCD), or an integrated touch screen in which touch sensing circuitry is partially or fully integrated into a display, etc. Touch screens can allow a user to perform various functions by touching the touch screen using a finger, stylus or other object at a location that may be dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels, for example, can be formed from a matrix of drive and sense lines of a substantially transparent conductive material such as Indium Tin Oxide (ITO), often arranged in rows and columns in horizontal and vertical directions on a substantially transparent substrate. Drive signals can be transmitted through the drive lines, which can make it possible to measure the static mutual capacitance at the crossover points or adjacent areas (sensing pixels) of the drive lines and the sense lines. The static mutual capacitance, and any changes to the static mutual capacitance due to a touch event, can be determined from sense signals that can be generated in the sense lines due to the drive signals.

SUMMARY OF THE DISCLOSURE

This relates generally to transitions between touch input selections, and more particularly, to selecting an input of contacts on or near a touch sensing surface. The contacts can be tracked to obtain touch information of the contacts, such as a number of contacts, motions of the contacts, timing of liftoffs and touchdowns, etc. A first gesture, corresponding to first touch information of a number of contacts performing an activity, can be detected, and a first input corresponding to the first gesture can be selected. A second gesture, corresponding to second touch information of a number of contacts performing an activity, can be detected, and a determination of whether to select a second input corresponding to the second gesture can be made. The second input can be selected if third information satisfies a predetermined criteria, and the first input can be maintained if the third information does not satisfy the predetermined criteria. The third information can include, for example, number of contacts down, number of contacts lifted off, motion and/or resting of all or a subset of the contacts, arrangement of the contacts, whether contacts are being added or removed, and other information, such as the currently selected input, the input to be selected, whether input has been locked, etc. In this way, for example, a touch sensing system can allow for more complex interactions and greater control over touch-based input.

BRIEF DESCRIPTION OF THE DRAWINGS

FIGS. 1A-1D illustrate an example mobile telephone, an example digital media player, an example personal computer, and an example wireless trackpad that each include functionality according to embodiments of the disclosure.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

The disclosed example embodiments relate to selecting an input of a touch sensing surface. A user may perform a touch input, for example, by contacting a touch sensing surface of a computing system with one or more fingers. For example, the user may perform a certain activity, such as a motion, a tap, etc., with a particular number of fingers on the touch sensing surface to move a cursor, click a button, scroll a document, select text with a dragging motion of a cursor, etc. The contacts corresponding to the user's fingers can be tracked to obtain touch information of the contacts, such as a number of contacts, motions of the contacts, timing of liftoffs and touchdowns, etc. The touch information can be used to detect gestures that correspond to various inputs.

For example, a first gesture, corresponding to first touch information of a number of contacts performing an activity, can be detected, and a first input corresponding to the first gesture can be selected. For example, a user may touchdown two fingers and move them vertically, a two-finger vertical motion gesture can be detected, and a corresponding scroll input can be selected. A second gesture, corresponding to second touch information of a number of contacts performing an activity, can be detected. For example, the user may touchdown an additional finger while the scroll input is selected. A determination of whether to select a second input corresponding to the second gesture can be made. The second input can be selected if third information satisfies a predetermined criteria, and the first input can be maintained if the third information does not satisfy the predetermined criteria. The third information can include, for example, number of contacts down, number of contacts lifted off, motion and/or resting of all or a subset of the contacts, arrangement of the contacts, whether contacts are being added or removed, and other information, such as the currently selected input, the input to be selected, whether input has been locked, etc. In this way, for example, a touch sensing system can allow for more complex interactions and greater control over touch-based input.

Although embodiments disclosed herein may be described and illustrated herein in terms of mutual capacitance touch sensing surfaces, it should be understood that the embodiments are not so limited, but can be additionally applicable to, for example, self-capacitance, optical, resistive, and other touch sensing surfaces and technologies that can detect single and/or multiple touches on or near the surface.

Figure 1D:
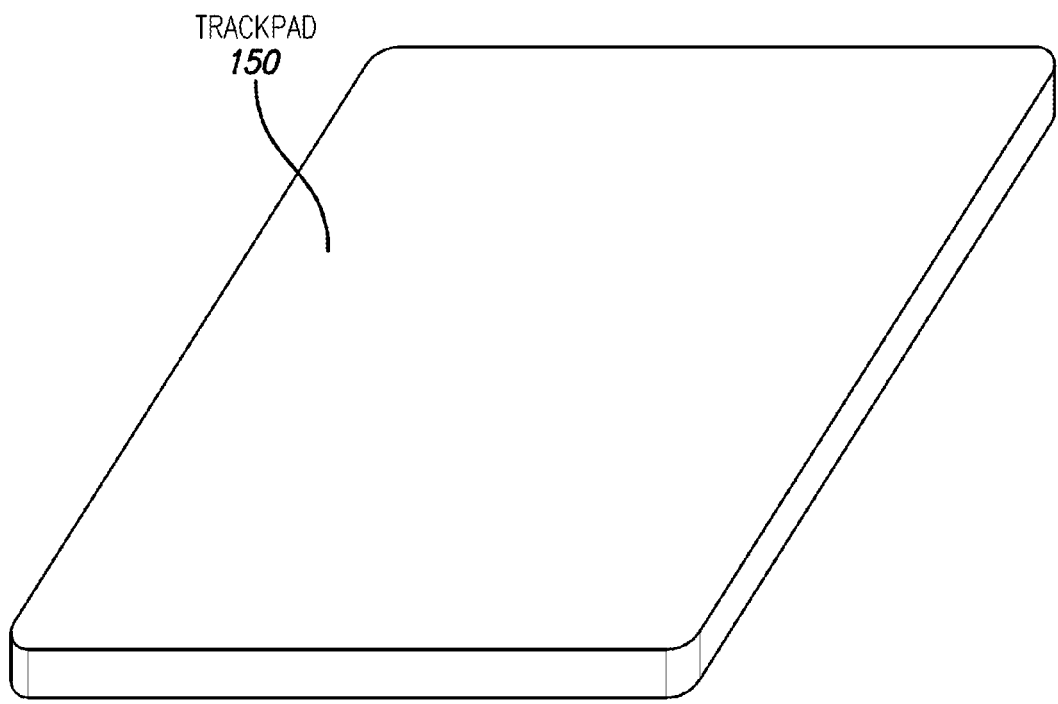

FIGS. 1A-1D show example systems in which embodiments of the disclosure may be implemented. FIG. 1A illustrates an example mobile telephone 136 with a touch screen 124. FIG. 1B illustrates an example digital media player 140 with a touch screen 126. FIG. 1C illustrates an example personal computer 144 with a touch screen 128 and a trackpad 130. FIG. 1D illustrates an example wireless trackpad 150, which can be wirelessly connected to a personal computer, such as personal computer 144, for example.

Figure 2:
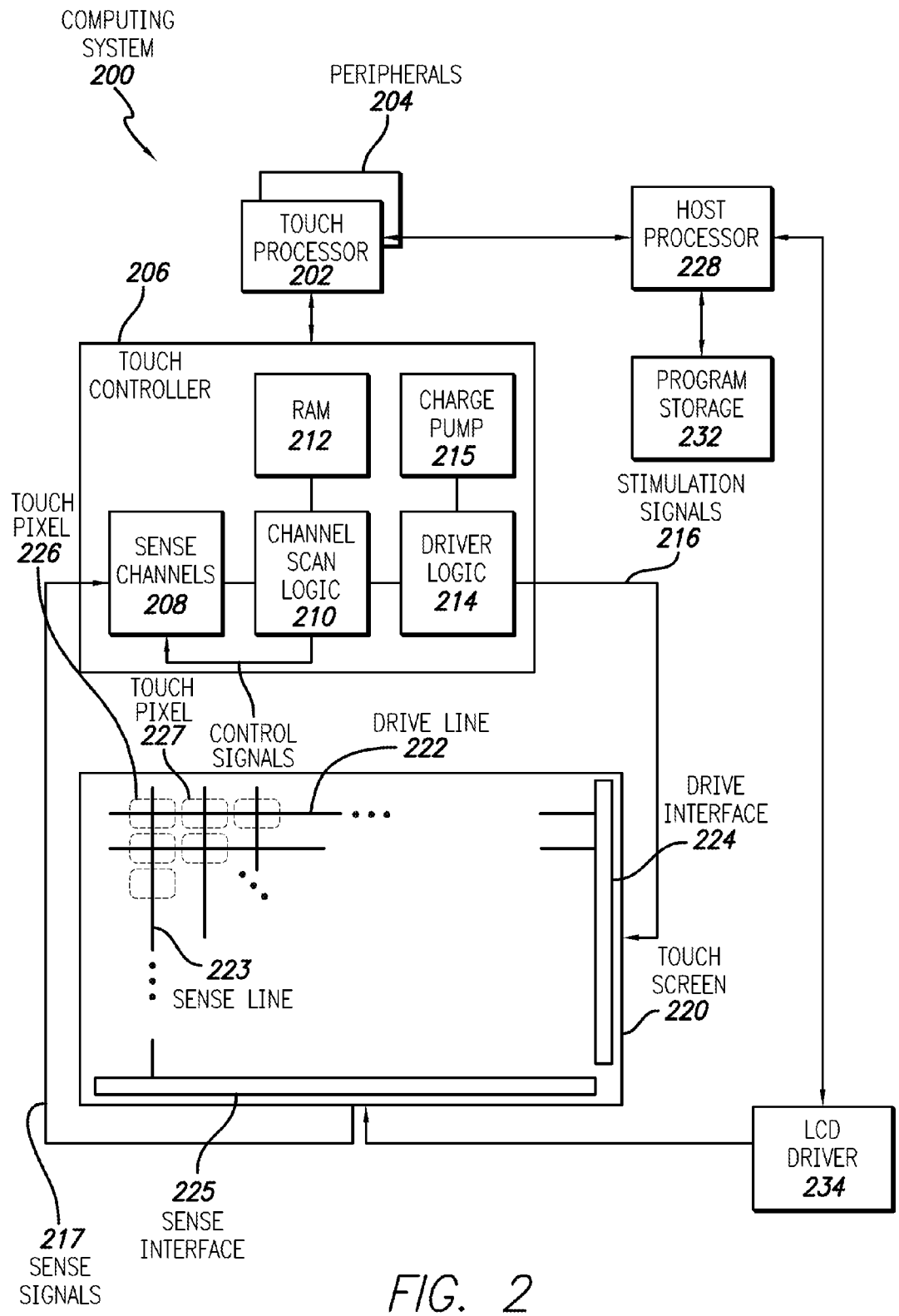
FIG. 2 illustrates an example computer system that includes functionality according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. A similar computing system, with similar touch sensing functionality and without the need for display functionality, can be included in, for example, trackpad 150. Computing system 200 can include a touch sensing system including one or more touch processors 202, peripherals 204, a touch controller 206, and touch sensing circuitry. Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220. In some embodiments, touch controller 206, touch processor 202 and peripherals 204 can be integrated into a single application specific integrated circuit (ASIC).

Touch screen 220 can include touch sensing circuitry that can include a capacitive sensing medium having a plurality of drive lines 222 and a plurality of sense lines 223. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200, and in particular the touch sensing system of computing system 200, can allow a user to enter inputs by, for example, tapping, sliding, etc., one or more touch devices, such as fingers, thumbs, etc., on a touch sensing surface, such as touch screen 220. A particular input may be selected, for example, based on a number of contacts on or near the touch sensing surface and a motion of the contacts. For example, one finger down on the touch sensing surface and moving may correspond to a point input that can cause a mouse cursor to move in the direction of the one-finger motion. Two fingers down on the touch sensing surface and moving may correspond to a scroll input that can cause a document displayed on a touch screen or display to scroll in the direction of the two-finger motion.

In order to transition between selected inputs, some systems may require that the user lift all fingers from the touch surface, and then drop the number of fingers required for the new input. In other words, some systems may simply retain the currently-selected input even though the number of fingers changes, until all fingers are lifted off. For example, to switch from a two-finger scroll input to a one-finger point input, a system may require that the user lift the two fingers and drop one finger back down. In this system, the scroll input can remain selected even after lifting one of the two fingers. On the other hand, some systems may simply select the current input that matches the current number of fingers down. In these systems, for example, each new finger liftoff/touchdown can cause the selected input to switch to the corresponding number of fingers down. In other words, these two systems can either always allow or never allow switching between inputs while some fingers remain down.

Described below are various example embodiments in which switching the selected input can be based on whether or not information, such as touch information based on characteristics of the contacts corresponding to the fingers, or other information, such as a current state of operation, satisfies certain predefined criteria. In the following examples, a "finger" can include a finger or a thumb, unless otherwise noted.

Example embodiments are described below using an example set of inputs that correspond to various combinations of contact numbers/arrangements and activities, as summarized in Table 1. When a combination of contact number/arrangement and activity, also referred to as a "base gesture" herein, is detected by a touch sensing system, a corresponding input can be made to a computing system, such as computing system 200.

TABLE 1

| Base Gesture | Input |
| --- | --- |
| One-Finger (1F) Tap | Primary Mouse Click |
| One-Finger Motion | Point |
| Two-Finger (2F) Tap | Secondary Mouse Click |
| Two-Finger Motion | Scroll |
| Three-Finger (3F) Motion - user selectable, one of: | Swipe Drag |
| Four-Finger (4F) Vertical Motion | View All Windows |
| Four-Finger Horizontal Motion | Application Switching |

In the present example, the touch system can enter a state of "no current input" when no touches are detected by the touch system, e.g., the user is not touching the touch surface. While in the no input state, if one of the base gestures is detected, its corresponding input can be selected without requiring further evaluation. Thus, a user can select one of the inputs in Table 1 directly by lifting all fingers, dropping (i.e., touching down) the number of fingers corresponding to the desired input, and performing the corresponding activity (e.g., tapping, motion). The user can lift all fingers when the desired input is complete, returning the system to the no input state.

In addition, the example touch system can allow for more complex interactions that can include lifting, dropping, resting, and/or moving one or more additional fingers while a current input is selected. The touch system can decide whether or not to switch the currently selected input to a new input based on touch information determined from various characteristics of the contacts, such as number of contacts down, number of contacts lifted off, motion and/or resting of all or a subset of the contacts, arrangement of the contacts, whether contacts are being added or removed, and other information, such as the currently selected input, the input to be selected, whether input has been locked, etc.

FIGS. 3-10 illustrate example methods of determining when to allow and when to prevent switching from a currently selected input/state to a new input/state. The example methods described below do not necessarily cover all possible switching scenarios that could occur, but provide examples in which various touch information and other information can be compared to predefined criteria to determine whether or not to switch inputs.

Figure 3:
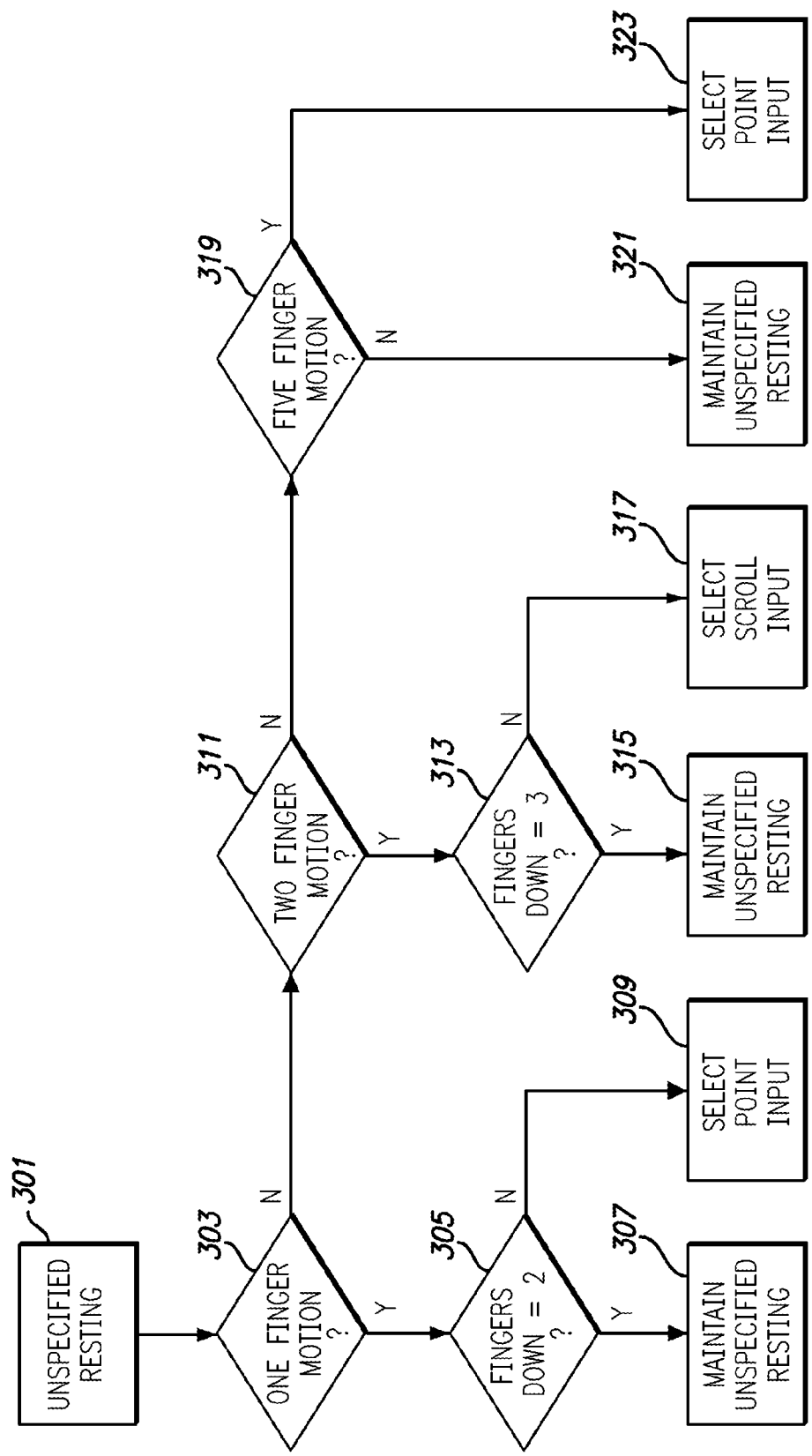
FIG. 3 illustrates an example method of transitioning from an unspecified resting state according to embodiments of the disclosure.

FIG. 3 illustrates an example method of transitioning from an unspecified resting state. An unspecified resting state can be, for example, a state in which all fingers are resting and no input has been selected. The unspecified resting state can be entered by, for example, dropping one or more fingers onto the touch surface while keeping the fingers substantially stationary on the surface. While in the resting state, certain transitions to selected inputs can be made, while other transitions may be prevented. Starting from unspecified resting state 301, if one-finger motion is detected (303) then the number of fingers down (i.e., the number of fingers currently touching the touch surface) can be counted (305). If the number of fingers down equals two, the unspecified resting state can be maintained (307). On the other hand, if the number of fingers down is not equal to two, a point input can be selected (309). In other words, starting from an unspecified resting state, a user can initiate a point input by moving one finger so long as more than two fingers are currently down. Thus, the determination of whether or not to select a new input can be based on touch information such as a total number of fingers down and whether the other fingers down are in a resting state (e.g., substantially stationary). The determination can also be based on other information, such as whether the current state is an unspecified resting state.

If one finger motion is not detected (303), and two finger motion is detected (311), then the number of fingers down can be determined (313), and if the number of fingers down equals three then the unspecified resting state can be maintained (315). On the other hand, if the number of fingers down is greater than three, then a scroll input can be selected (317). In other words, starting from an unspecified resting state, a user can move two fingers and initiate a scroll input so long as at least four fingers are down.

If five-finger motion is detected (319), then a pointing input can be selected (323). On the other hand, if five-finger motion is not detected, the unspecified resting state can be maintained (321). In other words, starting from the unspecified resting state, the user can move all five fingers to initiate a pointing input. It is noted that neither three-finger nor four-finger motion can initiate input from the unspecified resting state. That is, if the user moves three or four fingers, the unspecified resting state is maintained. On the other hand, if the user moves one, two, or five fingers, a new input state can be selected. In this example embodiment, once an input is selected, a subsequent resting of the fingers will not enter the unspecified resting state, unless there is a lift off of all fingers and a subsequent touch down in the resting state. In other words, the currently selected input will remain selected even though fingers subsequently rest.

Figure 4:
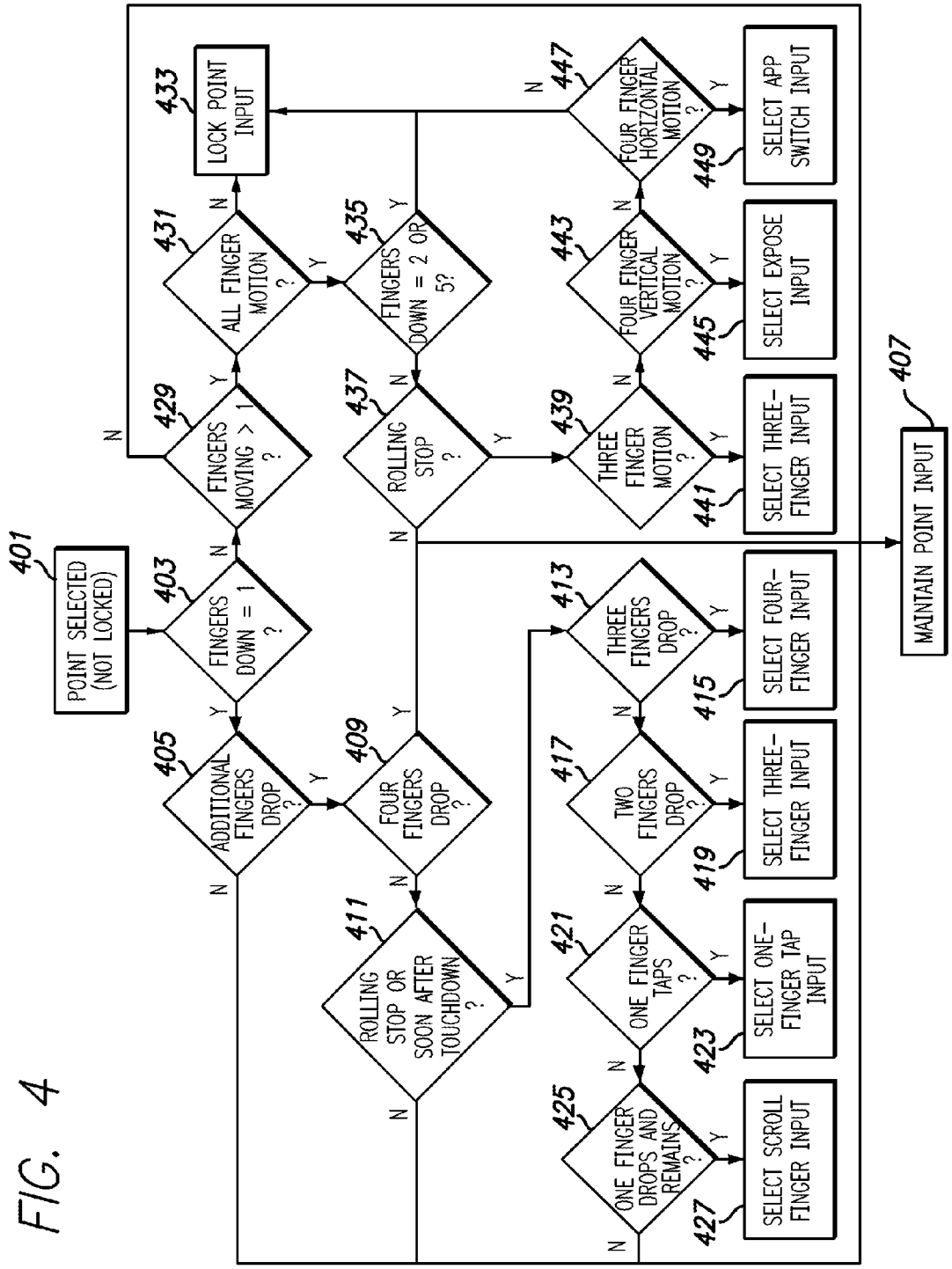
FIG. 4 illustrates an example method of transitioning after a point input has been selected but not locked according to embodiments of the disclosure.

FIG. 4 illustrates an example method of transitioning after a point input has been selected but not locked. Locking point input is described in more detail below. Starting from a point input selected 401, if the number of fingers down is one (403), then the user can be pointing with a single finger. Other inputs that can occur when the user is pointing with a single finger down can include additional finger drops (405). If additional fingers are not dropped, the point input can be maintained (407). On the other hand, if additional fingers drop during single-finger pointing then further testing can take place to determine whether to switch inputs. If four fingers drop (409) then pointing input can be maintained (407). If four fingers do not drop, then it can be determined (411) if the additional finger drop occurred at a rolling stop of the single finger or that the additional finger drop occurred soon after the touch down of the single finger. A rolling stop can be determined, for example, by determining a measure of deceleration of motion. For example, the touch system can include a pair of autoregressive filters including a slow filter, which can provide an indication of average speed of contact motion over a longer period of time, and a fast filter, which can provide an indication of average speed of contact motion over a shorter period of time. Comparing the outputs of the two filters can provide an indication of whether the contact motion is decelerating, for example. A rolling stop can be determined if the output of the fast filter falls below a predetermined fraction of the slow filter, for example.

Referring again to the determination (411) of whether the single finger was at a rolling stop, it may be determined that the additional finger drop occurred at a rolling stop of the single finger if the additional finger drop occurred within a predetermined time before or after a rolling stop of the single finger motion is determined by comparison of the autoregressive filters, for example. To determine whether the additional finger drops occurred soon after the touch down of the single finger, for example, an additional finger drop of a certain number of fingers can be allowed to select a new input if the drop occurs within, for example, 125 milliseconds of an initial touch down of the single finger. If the additional finger drop does not meet one of the criteria that the first finger is at a rolling stop or soon after initial touchdown, then the point input selection can be maintained (407). On the other hand, if the criteria is met (411) then if three additional fingers drop (413), then a four-finger input can be selected (415). If two additional fingers drop (417) then a three-finger input (e.g., swipe or drag) can be selected (419). If a one-finger tap is detected (421), then a one-finger tap input can be selected (423). If a one-finger drop is detected and the dropped finger remains down (425), then a scroll input can be selected (427). Otherwise, the point input can remain selected (407).

In other words, if a user is pointing with one finger down, the user can change the selected input by dropping one, two, or three fingers, so long as the one finger down comes to a rolling stop before dropping the additional fingers. Additional finger drops of four fingers and finger drops that do not occur at a rolling stop or soon after initial single-finger touchdown may not switch the input from the selected pointing input. Thus, the determination of whether or not to select a new input can be based on touch information such as total number of fingers down, number of additional fingers dropped, and whether the single finger is at a rolling stop.

If more than one finger is down while point input is selected, one way in which the user can select another input can be to move more than one finger. However, the touch system can require that certain criteria be satisfied in order for a new input to be selected. If one or zero fingers are moving (429), then pointing input can be maintained (407). On the other hand, if more than one finger is moving (429), then it can be determined whether all of the fingers currently down are in motion (431). If all fingers down are not moving, then a point input can be locked (433). In other words, if point input is currently selected, and more than one but not all of the currently down fingers are moving, then the selection of point input can be locked. Locked point input will be described in more detail in FIG. 5.

If it is determined that all fingers down are in motion (431) then it can be determined whether the number of fingers down is equal to two or five (435). If the finger count is two or five then the point input can be locked (433). On the other hand, if the finger count is not equal to two or five, it can be determined whether motion of all of the fingers down occurred at a rolling stop (437). If the motion did not occur after at a rolling stop, the pointing input can be maintained (407). On the other hand, if the fingers down are at a rolling stop (437), then if there are three fingers in motion (439) then a three-finger input (such as swipe or drag) can be selected 441). If four-finger vertical motion is detected (443), then a view all windows input can be selected (445). If a four-finger horizontal motion is detected (447) then an application-switching input can be selected (449). Otherwise, the pointing input can be locked (433).

In other words, if the user is in a resting point input, that is, pointing is currently selected and the user has more than one finger down, then the user can continue pointing by moving just one finger. The user can switch to another input by making certain multi-finger motion that meet certain criteria. Specifically, if the user is pointing with one of three fingers down, comes to a rolling stop with the single finger, and initiates a three-finger motion, then a three-finger input can be selected. If the user has four fingers down and is moving a single finger in a pointing input, the user can enter one of the four-finger inputs by coming to a rolling stop with the single finger, and either initiating a four-finger vertical motion to switch to a view all windows input or initiate a four-finger horizontal motion to switch to an application switching input. All other multi-finger motion while pointing is selected can lock the pointing input selection.

Thus, the determination of whether or not to select a new input can be based on touch information such as a total number of fingers down, whether all or a subset of finger move, and whether fingers move at substantially the same time. The determination can also be based on other information, such as whether the currently selected input is locked, as will now be described in more detail.

Figure 5:
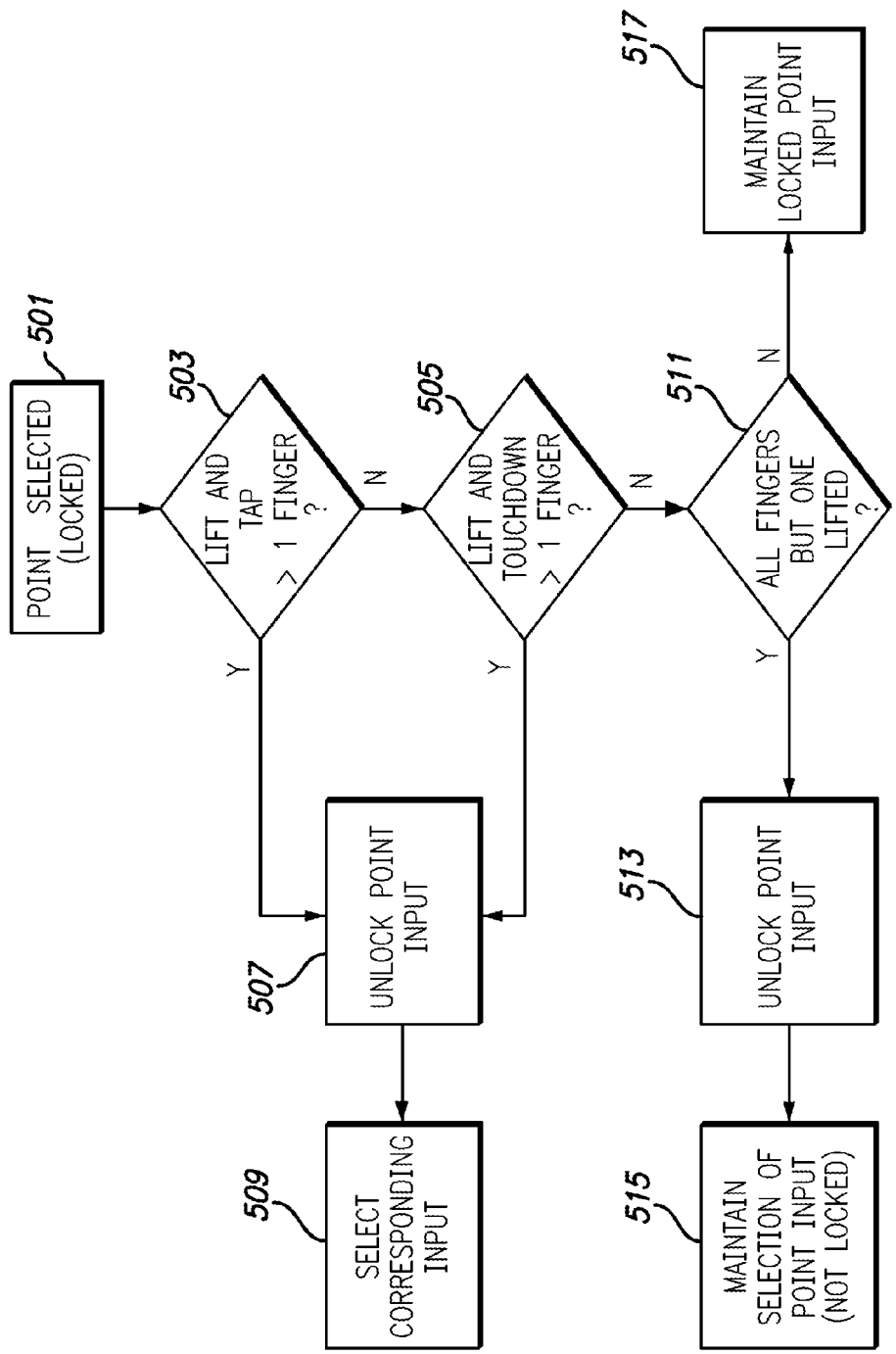
FIG. 5 illustrates one example method of transitioning from a locked point input according to embodiments of the disclosure.

FIG. 5 illustrates one example method of transitioning from a locked point input. Starting from a locked point input selection 501, a user can unlock the point input selection and select another input by lifting and tapping more than one finger (503) or by lifting and touching down more than one finger (505). In each of these cases the point selection can be unlocked (507), and the input corresponding to the number of fingers in the lift and tap or lift and touch down can be selected (509). Another way in which a user can unlock the point selection can be to lift all but one finger (511). If the user lifts all but one finger, the point input can be unlocked (513), and as long as the one finger remains touching, the selection of pointing input can be maintained (515) in an unlocked state. Otherwise, the selected input can remain locked in point input (517). Once the pointing input is locked, the user can point using a wide range of finger combinations and motions. This can allow a user freedom in pointing, which can be a common task. While maintaining at least one finger down, the user can still change input by initiating lifts and taps or lifts and touch downs of a subset of the total number of touchdown fingers. In addition, the user can simply lift all but one finger to unlock the selection of pointing, and therefore may select other inputs through additional actions once only one finger remains on the surface.

Figure 6:
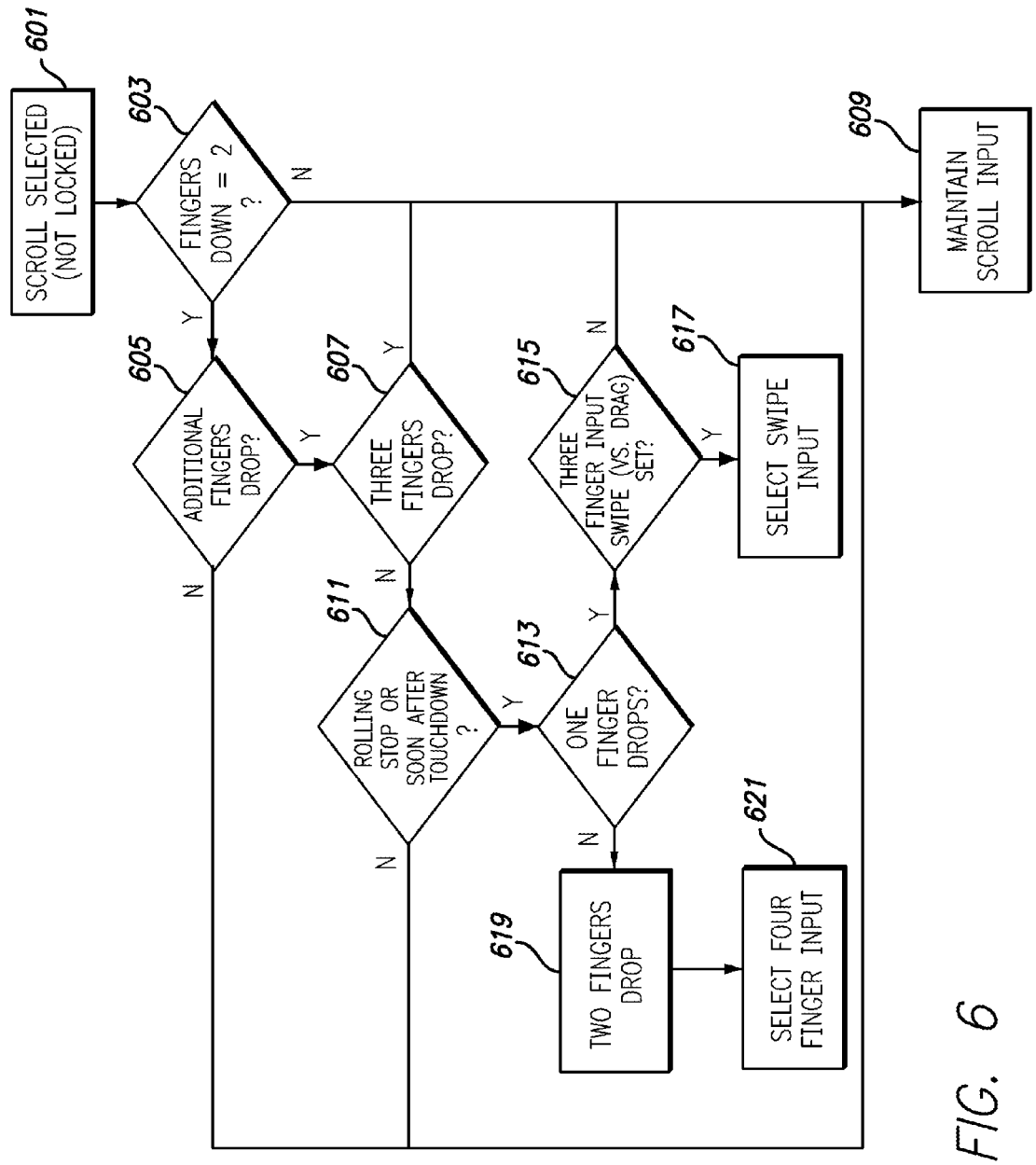
FIG. 6 illustrates an example method of transitioning from a currently selected scroll input that is not locked according to embodiments of the disclosure.

FIG. 6 illustrates an example method of transitioning from a currently selected scroll input that is not locked. Starting from the scroll input selection 601, if the number of fingers down equals two (603) then certain inputs may be selected by dropping additional fingers. If the user drops additional fingers (605), and the number of additional fingers dropped equals three (607), then the scroll input can be maintained (609). However, if the user drops one or two additional fingers, then an input may be changed if the additional finger drop occurs at a rolling stop of the two scrolling fingers or if the additional fingers drop soon after the touchdown of the original two scrolling fingers (611). If the two scrolling fingers are not at a rolling stop or did not touch down soon before the additional finger drop, then the scroll input can be maintained (609). However, if the two scrolling fingers are at a rolling stop, or touchdown soon before, a drop of an additional one finger (613), then selection of a new input can depend on whether the user has set the three-finger input to a swipe input or a drag input. If the user has set the three-finger input to a swipe input (615) then the swipe input can be selected (617). However, if the user has selected the three-finger input as drag input, then the scroll input can be maintained (609), i.e., the system can prevent switching to drag input. In other words, while in a two-finger scroll, the user can switch to a swipe input with an additional finger drop at a rolling stop, however a user cannot switch to a three-finger drag input from a two-finger scroll in the same manner. Thus, the determination of whether or not to switch to a new input can depend on information such as the function of the new input, e.g., given the same touch information, such as number of contacts, motion, etc., switching to a new input a may depend on the function a user has chosen to correspond to a particular base gesture, for example.

This can, for example, provide an improved user experience by allowing switching when a motion associated with switching matches a motion associated with the new input, and preventing switching when a motion associated with the switching does not match a motion associated with the new input. In this example, a user may typically use quick motions for swipe inputs and slower motions for drag inputs. Allowing a user to switch to swipe input at a rolling stop of two-finger scroll may be a better match for a typical quick motion used at a rolling two-finger stop than a typically slower drag motion. In addition, it may be more typical that a user would want to switch to a swipe input from a scroll input than switch to a drag input from a scroll input. In this way, for example, using different information, such as touch information and other information, to determine whether or not to allow switching to a new input, can allow the design of a touch sensing system to be more natural and easy to use.

Referring again to FIG. 6, if the two fingers of the scroll are at a rolling stop or touch down soon before (611) and the user drops two additional fingers (619) then a four-finger input can be selected (621). The four-finger input can be, for example, dependent on the particular direction of motion of the four fingers. In this case, at step 621, additional motion testing may be required in order to generate the four-finger input, e.g., a view all windows input or an application switching input. In contrast to dropping an additional single finger, dropping an additional two fingers can switch to a new input event regardless of the function of the input event to be switched to.

It is noted that, in contrast to a single finger pointing input selection, a scroll input selection in this example embodiment does not include additional ways to transition to different inputs using motion of additional fingers alone, without requiring additional finger drops. It may be more likely that a user performing a two-finger scroll would unintentionally move additional fingers than if the user were performing a one-finger point, for example.

Figure 7:
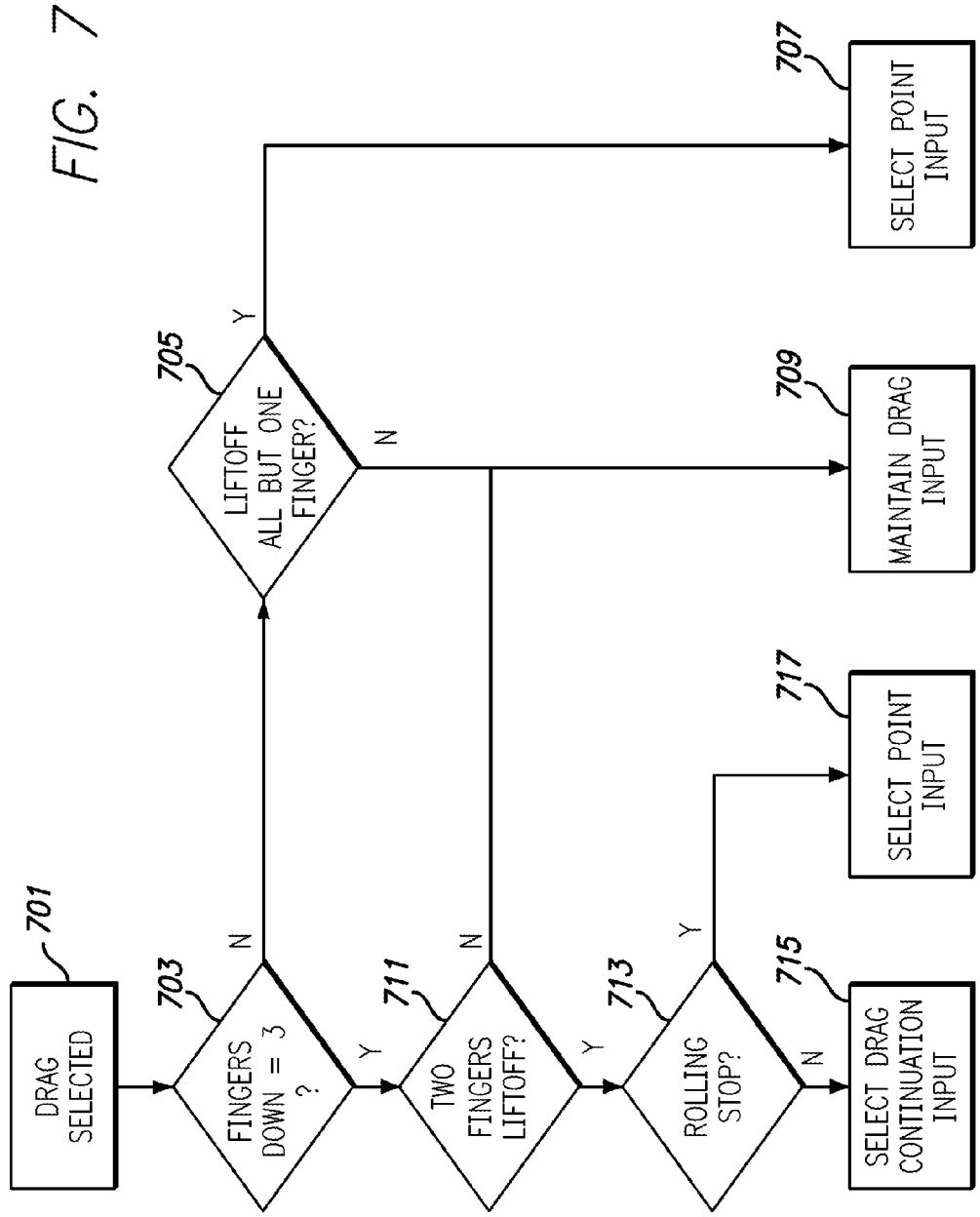
FIG. 7 illustrates an example method of transitioning from a drag input according to embodiments of the disclosure.

FIG. 7 illustrates an example method of transitioning from a drag input according to embodiments of the disclosure. Starting from the drag input selection 701, the system can determine if the number of fingers down is equal to three (703). If the number of fingers down is not equal to three, then if all fingers but one liftoff (705), then the input can be switched to point input (707); otherwise, the drag input can be maintained (709). If the number of fingers down is equal to three (703), then if a two-finger liftoff occurs (711) and the three-finger drag is not at a rolling stop (713), then a drag continuation input can be selected (715). If the two-finger liftoff occurs at a rolling stop (713) of the three-finger drag, then the input can be switched to point input (717). If two fingers do not lift off (711), then the drag input can be maintained (709).

In other words, if a user is dragging with three fingers, a drag continuation input can be selected by lifting off two of the three fingers while not at a rolling stop. The drag continuation input is described in more detail with regard to FIGS. 8-9.

Figure 8:
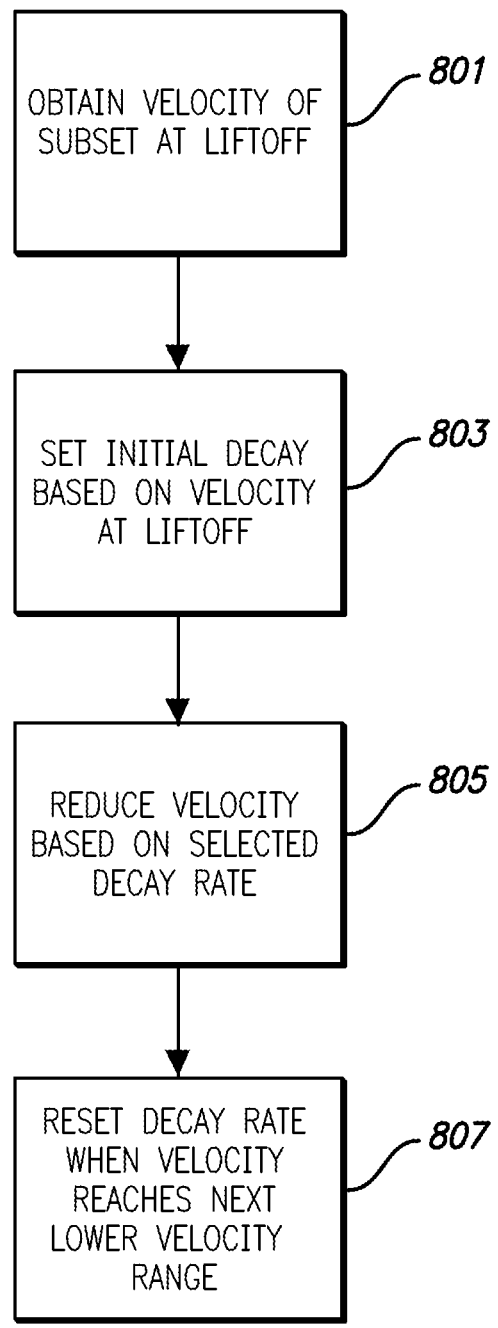
FIGS. 8-9 illustrate an example drag continuation input according to embodiments of the disclosure.
Figure 9:
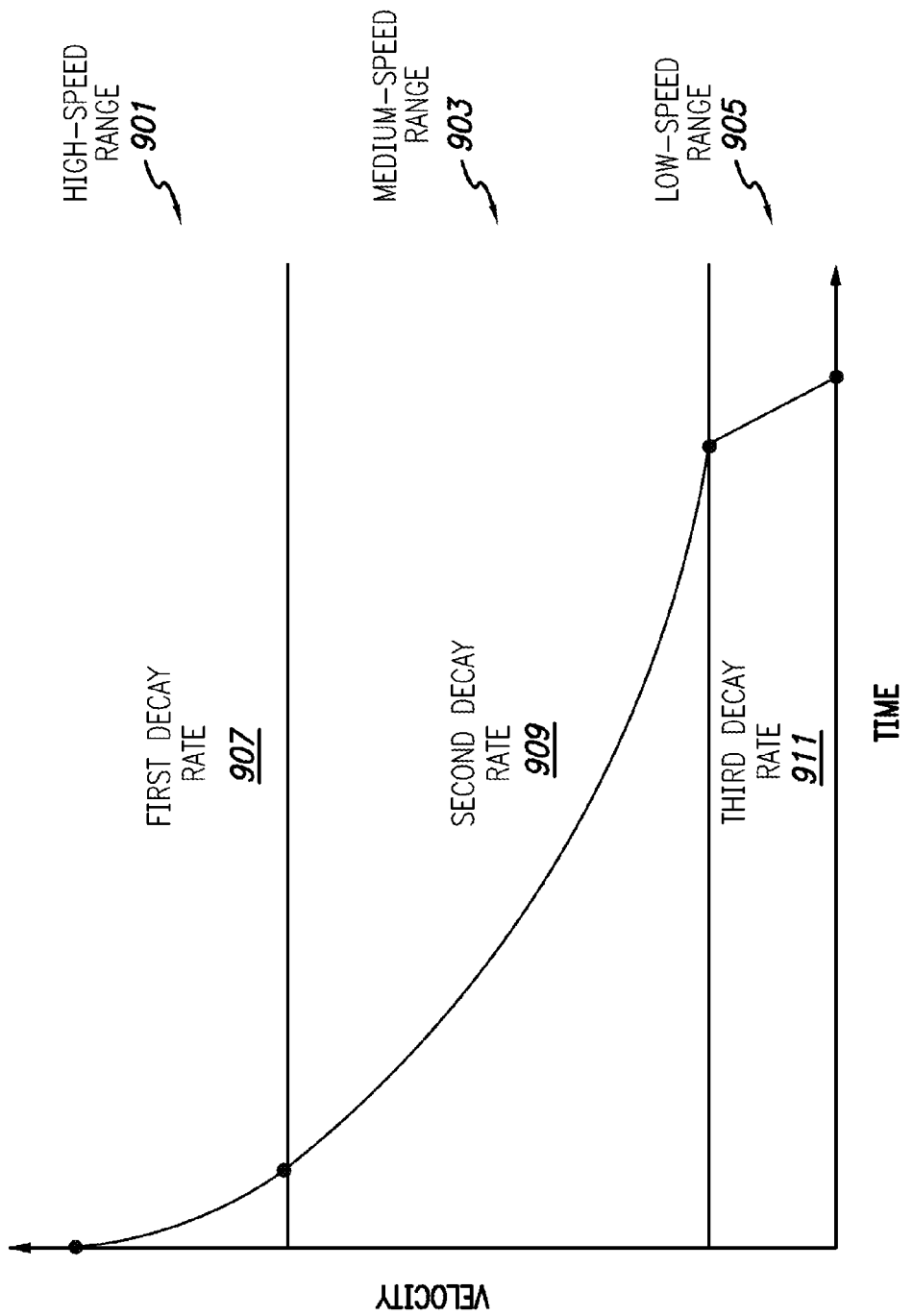

FIGS. 8-9 illustrate an example drag continuation input according to embodiments of the disclosure. Referring to FIG. 8, the velocity of the two-finger subset lifting off during a three-finger drag is obtained (801). An initial decay rate is determined and set (803) based on the liftoff velocity. FIG. 9 illustrates an example graph showing three velocity ranges, a high-speed range 901, a medium-speed range 903, and a low-speed range 905, corresponding to a first decay rate 907, a second decay rate 909, and a third decay rate 911. In this example, the liftoff velocity is in high-speed range 901, therefore, first decay rate 907 can be selected (803) as the initial decay rate, and motion of the drag input can be initially continued at the liftoff velocity and subsequently reduced based on the initial decay rate (805). When the velocity of the continued drag motion reaches a next-lower velocity range, the decay rate can be reset to the decay rate of the next-lower range (807). In this example, when the decaying drag motion continuation reaches medium-speed range 903, second decay rate 909 can be selected and the continued drag motion can be reduce based on the second decay rate. Likewise, when the decaying drag continuation motion reaches low-speed range 905.

As shown in FIG. 9, the ranges and associated decay rates can be selected such that motion continuation initiated in a high-speed range, that may be so fast that the vision of a typical user may not be able to easily track the motion, can decay quickly. In this way, for example, motion continuation that is too fast for a user to follow can quickly be slowed to a more reasonable speed, e.g., the medium-speed range. Once the continued motion reaches the medium-speed range, the decay rate can be set so that the motion decays more slowly. In this way, for example, a relatively fast motion continuation can be maintained at a speed the user can visually track, for a longer period of time. Finally, when the continued motion becomes very slow, e.g., reaches the low-speed range, the decay rate can be set so that the motion decays quickly, so that the continued motion does not remain in a slow motion for too long before coming to a stop.

In some example embodiments, the ranges and rates of decay can be set such that a high-speed continued motion comes to a stop within a predetermined distance or time, regardless of the exact speed of the liftoff velocity within the high-speed range. Although the example motion continuation is described above with reference to a continued drag motion, one skilled in the art would understand the applicability to other forms of motion continuation, such as cursor motion continuation, scrolling motion continuation, etc.

Figure 10:
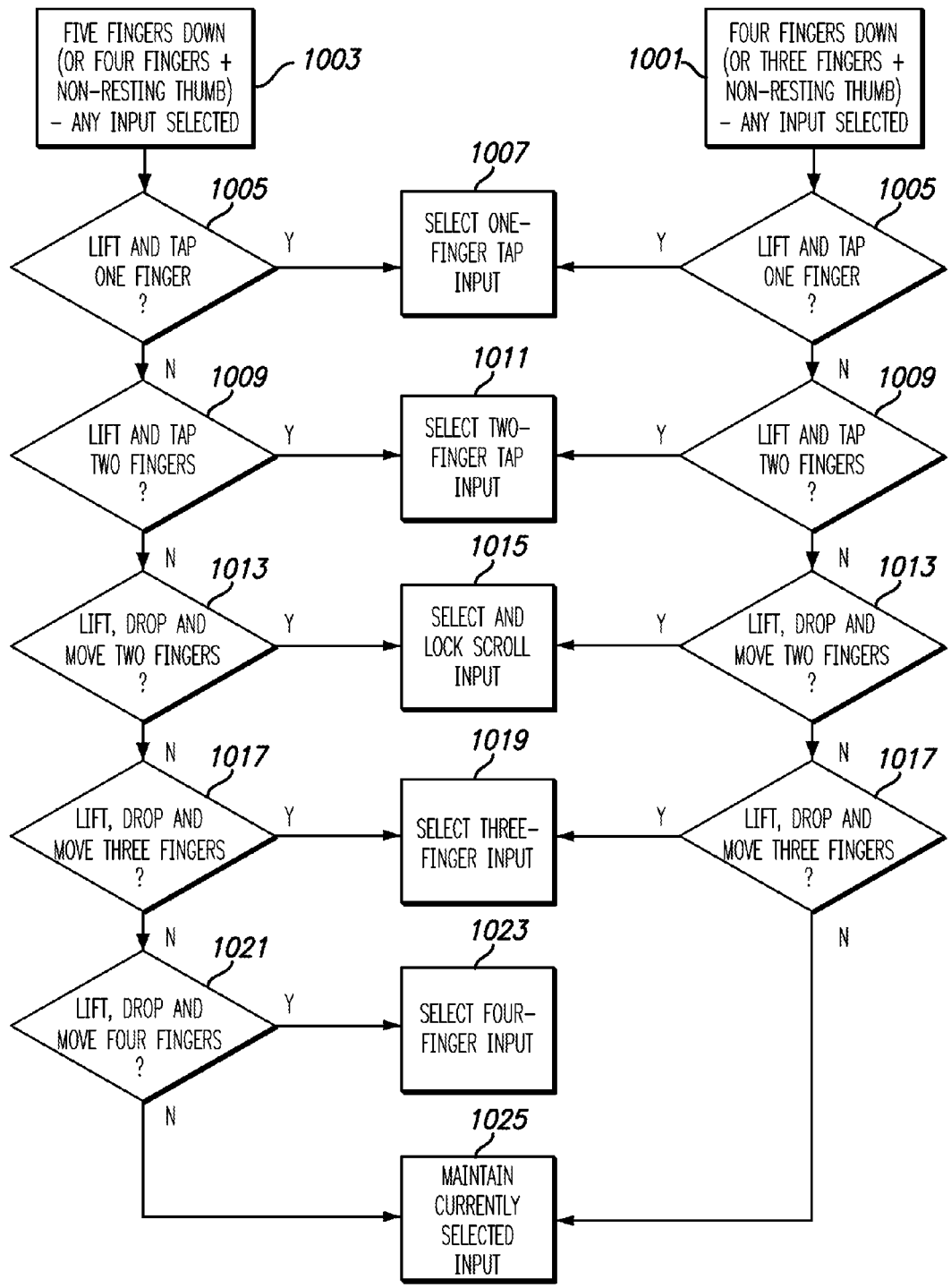
FIG. 10 illustrates an example method of transitioning based on lifting and dropping a subset of fingers according to embodiments of the disclosure.

FIG. 10 illustrates an example method of transitioning based on lifting and dropping a subset of fingers according to embodiments of the disclosure. In this example, the thumb can be considered a finger. However, in some embodiments, when the user drops a thumb in a thumb resting zone portion of the touch surface, the touch system can determine that the contact is a thumb, and can disregard input from the thumb, or allow the user to access specialized gestures involving the thumb.

FIG. 10 illustrates that a user can switch to base gesture input when resting with four or five fingers, even when a current input is selected, that is, when the four or five fingers down come to a rest, such as with a rolling stop. The process also can apply in a four or five finger unspecified resting state. With four (1001) or five fingers (1003) resting, the user can lift and tap one finger (1005) to switch to a one-finger tap input (1007), lift and tap two fingers (1009) to switch to a two-finger tap input (1011), lift, drop, and move two fingers (1013) to switch to a locked scroll input (1015), lift, drop, and move three fingers (1017) to switch to a three-finger input (1019), or, in the five-finger resting, lift, drop, and move four fingers (1021) to switch to a four-finger input (1023), else the currently selected input can be maintained (1025).

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method of selecting input of a computing system including a touch sensing surface, the method comprising:
    tracking contacts on or near the surface to obtain touch information of the contacts;
    detecting a first gesture corresponding to a first input of the computing system;
    selecting the first input in response to the detection of the first gesture;
    detecting a second gesture corresponding to a second input of the computing system; and
    determining whether to transition from the first input to the second input in response to the detection of the second gesture, wherein determining whether to transition includes determining whether first information satisfies a predetermined criteria, selecting the second input in response to the detection of the second gesture if the first information satisfies the predetermined criteria, and maintaining the first input despite the detection of the second gesture if the first information does not satisfy the predetermined criteria.

2. The method of claim 1, wherein the number of contacts performing the first gesture is different than the number of contacts performing the second gesture.

3. The method of claim 1, wherein the first and second inputs include one of a resting state, a primary mouse click, pointing, a secondary mouse click, scrolling, swiping, dragging, viewing all windows, and switching applications.

4. The method of claim 1, wherein the first information includes touch information of the contacts.

5. The method of claim 4, wherein the first information includes one of a total number of contacts, a number of contact liftoffs, a time of contact liftoffs, a number of contact touchdowns, a time of contact touchdowns, a number of resting contacts, and contact motion.

6. The method of claim 1, wherein the first information includes information of a current state of operation of the computing system.

7. The method of claim 1, wherein the first gesture includes one of a translational motion of one or more contacts, a rotational motion of a plurality of contacts, a scaling motion of a plurality of contacts, a liftoff of one or more contacts, a touchdown of one or more contacts, and a touchdown of one or more contacts followed by keeping the one or more contacts substantially stationary.

8. The method of claim 1, wherein a total number of contacts on or near the surface during the second gesture is greater than the number of contacts performing the second gesture.

9. A computing system including a touch sensing surface, the system comprising:
    a contact tracker that tracks contacts on or near the surface to obtain touch information of the contacts; and
    an input selection system that
        detects a first gesture corresponding to a first input of the computing system,
        selects the first input in response to the detection of the first gesture,
        detects a second gesture corresponding to a second input of the computing system, and
        determines whether to transition from the first input to second input in response to the detection of the second gesture, wherein the input selection system determines whether first information satisfies a predetermined criteria, selects the second input in response to the detection of the second gesture if the first information satisfies the predetermined criteria, and maintains the first input despite the detection of the second gesture if the first information does not satisfy the predetermined criteria.

10. The computing system of claim 9, wherein the number of contacts performing the first gesture is different than the number of contacts performing the second gesture.

11. The computing system of claim 9, wherein the first and second inputs include one of a resting state, a primary mouse click, pointing, a secondary mouse click, scrolling, swiping, dragging, viewing all windows, and switching applications.

12. The computing system of claim 9, wherein the first information includes touch information of the contacts.

13. The computing system of claim 12, wherein the first information includes one of a total number of contacts, a number of contact liftoffs, a time of contact liftoffs, a number of contact touchdowns, a time of contact touchdowns, a number of resting contacts, and contact motion.

14. The computing system of claim 13, wherein the first information includes contact motion of a first set of one or more contacts, and determining whether the first information satisfies the predetermined criteria includes determining, based on the contact motion, whether the first set of one or more contacts is at a rolling stop.

15. The computing system of claim 14, wherein the first information further includes time of contact touchdown of one or more contacts of a second set, and determining whether the first information satisfies the predetermined criteria further includes determining, based on time of contact touchdown, whether one or more contacts of the second set touched down within a predetermined time of the rolling stop of the first set of one or more contacts.

16. The computing system of claim 9, wherein the first information includes information of a current state of operation of the computing system.

17. The computing system of claim 16, wherein the first information includes one of the identity of the first input event, the identity of the second input event, a user selected function of the second input event, and a locked state of the first input event.

18. The computing system of claim 9, wherein the first gesture includes one of a translational motion of one or more contacts, a rotational motion of a plurality of contacts, a scaling motion of a plurality of contacts, a liftoff of one or more contacts, a touchdown of one or more contacts, and a touchdown of one or more contacts followed by keeping the one or more contacts substantially stationary.

19. The computing system of claim 9, wherein a total number of contacts on or near the surface during the second gesture is greater than the number of contacts performing the second gesture.

20. A non-transitory computer-readable storage medium storing computer-executable instructions executable to perform a method of selecting input of a computing system including a touch sensing surface, the method comprising:
   tracking contacts on or near the surface to obtain touch information of the contacts;
   detecting a first gesture corresponding to a first input of the computing system;
   selecting the first input in response to the detection of the first gesture;
   detecting a second gesture corresponding to a second input of the computing system; and
   determining whether to transition from the first input to the second input in response to the detection of the second gesture, wherein determining whether to transition includes determining whether first information satisfies a predetermined criteria, selecting the second input in response to the detection of the second gesture if the first information satisfies the predetermined criteria, and maintaining the first input despite the detection of the second gesture if the first information does not satisfy the predetermined criteria.

21. The non-transitory computer-readable storage medium of claim 20, wherein the number of contacts performing the first gesture is different than the number of contacts performing the second gesture.

22. The non-transitory computer-readable storage medium of claim 20, wherein the first and second inputs include one of a resting state, a primary mouse click, pointing, a secondary mouse click, scrolling, swiping, dragging, viewing all windows, and switching applications.

23. The non-transitory computer-readable storage medium of claim 20, wherein the first information includes touch information of the contacts.

24. The non-transitory computer-readable storage medium of claim 23, wherein the first information includes one of a total number of contacts, a number of contact liftoffs, a time of contact liftoffs, a number of contact touchdowns, a time of contact touchdowns, a number of resting contacts, and contact motion.

25. The non-transitory computer-readable storage medium of claim 24, wherein the first information includes contact motion of a first set of one or more contacts, and determining whether the first information satisfies the predetermined criteria includes determining, based on the contact motion, whether the first set of one or more contacts is at a rolling stop.

26. The non-transitory computer-readable storage medium of claim 20, wherein the first information includes information of a current state of operation of the computing system.

27. The non-transitory computer-readable storage medium of claim 26, wherein the first information includes one of the identity of the first input event, the identity of the second input event, a user selected function of the second input event, and a locked state of the first input event.

28. The non-transitory computer-readable storage medium of claim 20, wherein the first gesture includes one of a translational motion of one or more contacts, a rotational motion of a plurality of contacts, a scaling motion of a plurality of contacts, a liftoff of one or more contacts, a touchdown of one or more contacts, and a touchdown of one or more contacts followed by keeping the one or more contacts substantially stationary.

29. The non-transitory computer-readable storage medium of claim 20, wherein a total number of contacts on or near the surface during the second gesture is greater than the number of contacts performing the second gesture.

30. A mobile computing device comprising:
   a touch sensing system, including a touch sensing surface, a contact tracker that tracks contacts on or near the surface to obtain touch information of the contacts, and an input selection system that detects a first gesture corresponding to a first input of the computing system, selects the first input in response to the detection of the first gesture, detects a second gesture corresponding to a second input of the computing system, and determines whether to transition from the first input to second input in response to the detection of the second gesture, wherein the input selection system determines whether first information satisfies a predetermined criteria, selects the second input in response to the detection of the second gesture if the first information satisfies the predetermined criteria, and maintains the first input despite the detection of the second gesture if the first information does not satisfy the predetermined criteria.

* * * * *